(12) United States Patent
Lu et al.

(10) Patent No.: US 9,167,272 B2
(45) Date of Patent: Oct. 20, 2015

(54) METHOD, APPARATUS AND SYSTEM FOR EXCHANGING VIDEO DATA IN PARALLEL

(75) Inventors: Manuel Lu, Union City, CA (US); Xuanming Du, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 809 days.

(21) Appl. No.: 13/456,152

(22) Filed: Apr. 25, 2012

(65) Prior Publication Data

US 2013/0286285 A1 Oct. 31, 2013

(51) Int. Cl.
| H04N 7/26 | (2006.01) |
| H04N 19/88 | (2014.01) |
| H04N 21/434 | (2011.01) |
| H04N 19/436 | (2014.01) |

(52) U.S. Cl.
CPC .............. *H04N 19/88* (2013.01); *H04N 19/436* (2013.01); *H04N 21/4347* (2013.01)

(58) Field of Classification Search
USPC .................................................... 375/240.01
See application file for complete search history.

(56) References Cited

U.S. PATENT DOCUMENTS

| 4,188,638 | A | * | 2/1980 | de Haan .......................... 386/300 |
| 5,027,193 | A | * | 6/1991 | Kani et al. ................ 375/240.01 |
| 5,047,865 | A | * | 9/1991 | Inoue ............................ 386/314 |
| 5,438,423 | A | | 8/1995 | Lynch et al. |
| 6,788,882 | B1 | | 9/2004 | Geer et al. |
| 2004/0190058 | A1 | | 9/2004 | Iida |
| 2005/0123058 | A1 | | 6/2005 | Greenbaum et al. |
| 2009/0027360 | A1 | | 1/2009 | Kwan et al. |
| 2010/0278271 | A1 | | 11/2010 | MacInnis |
| 2011/0072236 | A1 | * | 3/2011 | Mimar .............................. 712/4 |
| 2011/0096839 | A1 | * | 4/2011 | Gomila et al. ........... 375/240.16 |
| 2012/0320993 | A1 | | 12/2012 | Gannholm |
| 2013/0308057 | A1 | | 11/2013 | Lu et al. |

FOREIGN PATENT DOCUMENTS

TW 200629905 A 8/2006

OTHER PUBLICATIONS

TW 102115539—First Taiwanese Office Action and Search Report with English Translation issued Mar. 13, 2015 (9 pages).
U.S. Appl. No. 13/472,423—Notice of Allowance, mailed Nov. 26, 2014, 8 pages.
U.S. Appl. No. 13/472,423—Non-Final Office Action, mailed Aug. 14, 2014, 12 pages.

\* cited by examiner

*Primary Examiner* — Mohammed Rahaman
(74) *Attorney, Agent, or Firm* — Blakely Sokoloff Taylor & Zafman LLP

(57) ABSTRACT

Techniques and mechanisms for exchanging sets of video data each via multiple channels. In an embodiment, a first data set is distributed across the multiple channels according to a first mapping of the multiple channels each to a different respective one of multiple data types, where each of the multiple data types corresponds to a different respective dimension of a color space. In another embodiment, a second data set is distributed across the multiple channels according to a second mapping of the multiple channels each to a different respective one of the multiple data types, where the second mapping is different from the first mapping.

17 Claims, 6 Drawing Sheets

METHOD, APPARATUS AND SYSTEM FOR EXCHANGING VIDEO DATA IN PARALLEL

BACKGROUND

1. Technical Field

This disclosure relates generally to exchange video data, and in particular, but not exclusively to exchanging video data for a liquid-crystal-on-silicon ("LCOS") projector.

2. Background Art

Improvements in video hardware technology continue to provide for an increasingly wide variety of electronic device which can implement, or otherwise support, the display of increasingly high resolution video images. For example, successive generations of computer hardware, such as that in handheld devices or other such platforms, are of increasingly small form factor, and are capable of supporting increasingly high throughput exchanges of video data.

However, as a result, it is increasingly important for such platforms to support exchanges between more varied combinations of inter-device hardware or intra-device hardware. This is typically manifest as a need for video data to be exchanged in a particular format, order etc. which accommodates functionality of some downstream display hardware. Implementing functionality to address this need is constrained by the premium placed on size, weight, speed, cost, etc. in producing next-generation video devices. Accordingly, it is increasingly valuable to provide incremental improvements in efficiency for hardware to implement such functionality.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments variously provide techniques and/or mechanisms for determining, based on received video data, multiple data sets each for a different respective video frame. For each of the multiple data sets, a parallelization circuit according to an embodiment may perform a respective distribution of the data set across multiple channels—e.g. wherein the distribution of a first data set is according to a first mapping and wherein the distribution of a second data set is according to a second mapping. The first mapping may map the multiple channels each to a different respective one of multiple data types, where each of the multiple data types corresponds to a different respective dimension of a color space. Alternatively or in addition, the second mapping may differently map the multiple channels each to a different respective one of the multiple data types.

One or more characteristics of video data received by such a parallelization circuit may not be compatible with operation of display conditioning logic which for putting video data into condition for use by some display hardware. However, operations of the parallelization circuit—e.g. in combination with operations of encoders which are each coupled to different respective ones of the multiple channels—may contribute to providing video data comprising one or more characteristics which facilitate operations of such display conditioning logic.

Figure 1:
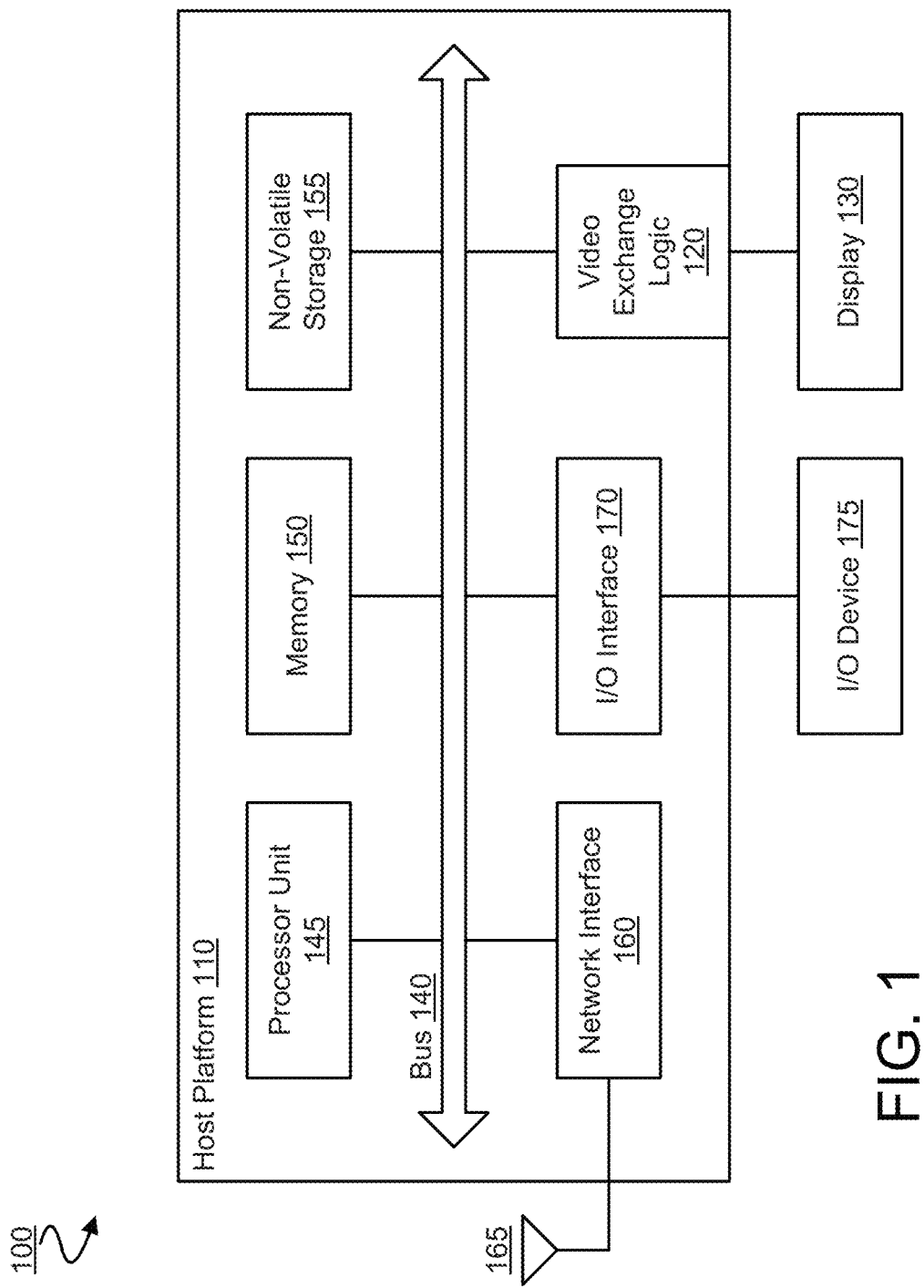
FIG. 1 is a block diagram illustrating elements of a computer system for exchanging video data according to an embodiment.

FIG. 1 illustrates elements of computer system 100 including any of a variety of combinations of logic—e.g. hardware, software and/or executing software logic—to exchange video data according to an embodiment. Computer system 100 may include host platform 110 and display 130, where video communications are to take place between host platform 110 and display 130 via video exchange logic 120. Host platform 110 may include any of a variety of platforms including, but not limited to, that of a desktop computer, laptop computer, server, handheld device (e.g. smart phone, PC tablet, palmtop, etc.), video gaming consol, digital video recorder, compact disc player, digital video disc player, set-top box or the like.

Display 130 may include a personal computer (PC) monitor, television, projector or other such hardware for receiving video data and presenting a video image to a user based on such video data. Display 130 may provide light-emitting diode (LED), organic LED (OLED), plasma, liquid-crystal-on-silicon (LCOS), laser and/or other such mechanisms for presenting a video image. Although shown as coupled to (distinct from) host platform 110, display 130 may, in an alternate embodiment, be integrated into host platform 110.

Video exchange logic 120 may provide one or more hardware mechanisms to receive video data and process such video data in preparation for providing the resulting processed video data for use by display 130. Such processing may, for example, include video exchange logic 120 variously performing any of a variety of combinations of evaluating, encoding/decoding, distributing, serializing, synchronizing and/or other operations such as those discussed herein. Such processing may, in an embodiment, be in addition to other video data processing performed by other logic of host platform 110 and/or by other logic of display 130.

FIG. 1 shows an illustrative architecture of host platform 110 for providing video data to be operated on by video exchange logic 120. The architecture of host platform 110 may include any of a variety of additional or alternative features, according to different embodiments. For example, certain embodiments are not limited with respect to the particular components of host platform 110 for operating with video exchange logic 120 and/or with respect to the respective configuration of such components relative to one another.

In one embodiment, host platform 110 includes one or more buses—e.g. including bus 140—and components variously coupled thereto. By way of illustration and not limitation, host platform 110 may include one or more of processor unit 145, memory 150, non-volatile storage 155, network interface 160, and I/O interface 170, some or all of which are variously coupled to one another, for example, via bus 140. Although shown as residing within host platform 110, some or all of video exchange logic 120 may be alternatively located, according to different embodiments, in display 130 and/or in some dedicated device distinct from, and coupled between, host platform 110 and display 130.

Processor unit 145 may include one or more processor cores to execute basic Input/Output System instructions, operating system instructions and/or other software code to facilitate preparations for an exchange of video data. Such code may, for example, be accessed by processor 145 from memory 150—e.g. where memory 150 includes some random access memory (RAM) such as dynamic RAM (DRAM), static RAM (SRAM) and/or the like. By way of illustration and not limitation, processor unit 145 may execute code for providing video content to video exchange logic 120 directly or indirectly from non-volatile storage 155—e.g. where non-volatile storage 155 includes a magnetic hard disk, solid state drive, optical disk, and/or other such form of data storage.

Alternatively or in addition, processor unit 145 may execute code which causes host platform 110 to receive such video content via network interface 160. In an embodiment, network interface 160—e.g. including an analog modem, Integrated Services Digital Network (ISDN) modem, wireless modem, network interface card (NIC) and/or the like—is to receive video content from any of a variety of combinations of one or more networks (not shown) including, but not limited to, a local area network (LAN), wide area network (WAN), virtual LAN (VLAN), cloud network, cellular network, Internet and/or the like. For example, network interface 160 may download content from a video streaming service via either one or both of a wired network and a wireless network—e.g. using one or more antenna 165 of host platform 110 coupled thereto.

In certain embodiments, host platform 110 includes one or more input/output (I/O) mechanisms for a user to receive and/or provide information. By way of illustration and not limitation, host platform 110 may include an I/O interface 170 for exchanging I/O data with some I/O device 175 including one or more of a mouse, touchpad, touchscreen, keyboard printer, scanner and/or other such I/O hardware. Operation of I/O device 175 may allow user access to operations of processor unit 145, information stored in memory 150 and/or non-volatile storage 155, or other such components of host platform 110. Although shown as coupled to (distinct from) host platform 110, I/O device 175 may, in an alternate embodiment, be integrated into host platform 110.

Figure 2:
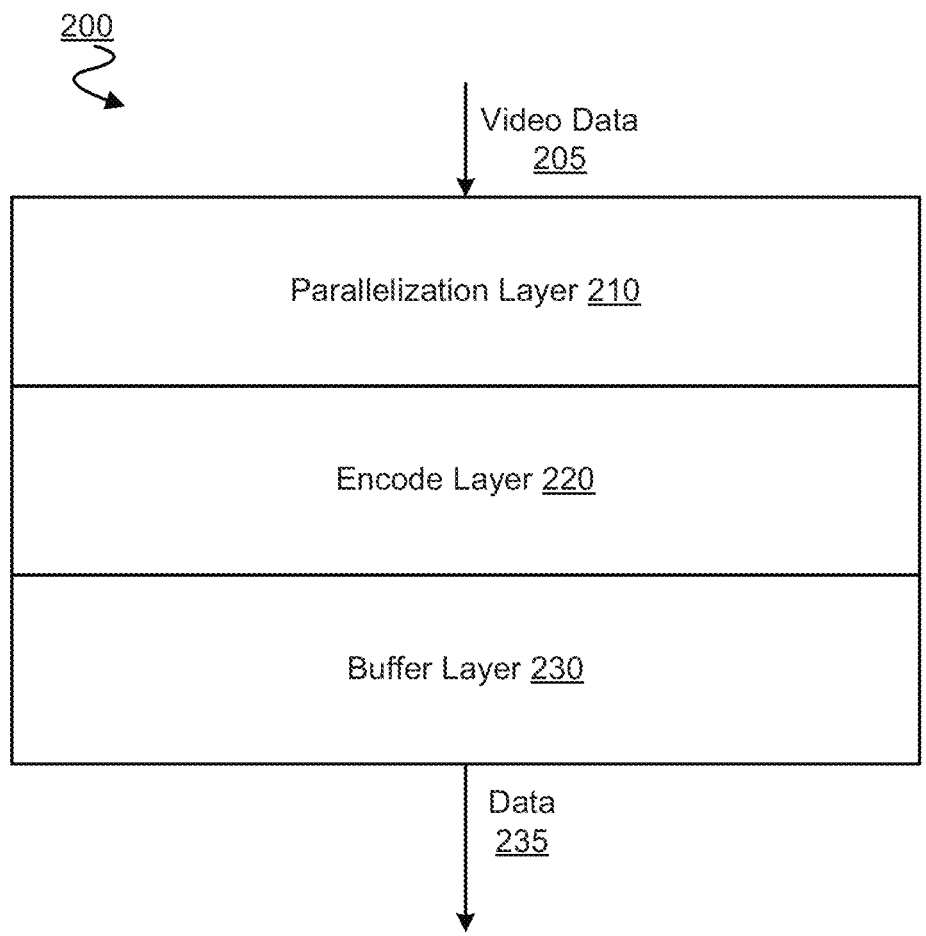
FIG. 2 is a block diagram illustrating elements of a functional stack for exchanging video data according to an embodiment.

FIG. 2 illustrates elements of functional stack 200 for exchanging video data in parallel according to an embodiment. Functional stack 200 may be implemented in a system including some or all of the features of computer system 100, for example. By way of illustration and not limitation, some or all of functional stack 200 may be implemented by logic having one or more features of video exchange logic 200.

In an embodiment, video data 205 is made available—e.g. by a network streaming channel or non-volatile storage of a platform including hardware of parallelization layer 210. A format, order, grouping, timing and/or other characteristic associated with video data 205 may not be compatible with some operation of logic (not shown), referred to herein as display conditioning logic, which puts video data into condition for use by some display hardware.

By way of illustration and not limitation, display conditioning logic coupled to functional stack 200 may operate based on a video data sequence to strobe different portions— e.g. a red portion, a green portion and a blue portion—of a given image at different times. Such logic may provide pulse width modulation and/or other mechanisms to convert video data for operating LCOS, LED and/or other light emitting pixel circuitry. Additionally or alternatively, such logic may perform a comparison of information for a next video frame with information for a preceding video frame—e.g. the comparison to identify some duplicative or otherwise redundant portion of the next video frame. The variety and/or extent of operations by different display conditioning logic—and the respective requirements imposed by such operations—may differ widely, and are not limiting on certain embodiments.

Functional stack 200 may include a sequence of operational stages (referred to herein as "layers") to receive video data 205—e.g. in series—and to operate on video data 205. In an embodiment, functional stack 200 is to buffer, encode/decode, reorder, synchronize and/or otherwise process video data 205 in order to provide some data 235. As provided by functional stack 200, data 235 may include one or more characteristics which facilitate one or more later operations of display conditioning logic.

In an embodiment, functional stack 200 includes buffer layer 230 comprising any of a variety of combinations of one or more physical and/or logical buffers to store data which is based upon video data 205. Data 235, based upon video data 205, may be debuffered from buffer layer 230 with a format, order, timing and/or other characteristic which facilitates one or more operations of display conditioning logic.

To facilitate efficient buffering by buffer layer 230, functional stack 200 may include an encode layer 220 comprising one or more encoders to operate on a data set which is determined based upon video data 205. Such encoding operations may, for example, include encode layer 220 performing a discrete cosine transform (DCT) or other frequency domain transform of a data set. DCT compression may be useful, for example, for JPEG-formatting of video content. However, certain embodiments are not limited with respect to the particular type of encoding implemented by encode layer 220. In certain embodiments, encode layer 220 provides data compression functionality—e.g. where encode layer 220 generates an encoded version of a data set which is smaller than the data set in its pre-encoded form. Such data compression functionality may allow for buffer layer 230 to have comparatively small buffer capacity and/or use. By way of illustration and not limitation, data compression performed by encode layer 220 may allow some or all buffers of buffer layer 230 to be implemented with SRAM logic which, for example, is included in an integrated circuit (IC) package with other logic of functional stack 200. Such SRAM logic may be smaller and/or cheaper than an alternative embodiment—e.g. in which buffer layer 230 is implemented by one or more dedicated DRAM devices.

Functional stack 200 may further comprise parallelization layer 210 including logic to provide one or more data sets for encoding by encode layer 220. Such one or more data sets may be determined by parallelization layer 210 based upon video data 205. In an embodiment, the received video data 205 describes one or more frames of video which each include a respective set of pixels. The color of a given pixel in a video frame may be comprised of one or more color components which each correspond to a respective dimension of a color space. For example, one or more color components (also referred to herein as "components") which comprise a pixel cell's overall color may each correspond to a respective one of a red dimension, green dimension and blue dimension of a Red-Green-Blue (RGB) color space. Alternatively or in addition, one or more components of a pixel color may each correspond to a respective one of a luma dimension and one or more chrominance dimensions of a YUV color space.

In an embodiment, video data 205 includes a data set (e.g. a block of data) describing some or all of a particular video frame. For example, such a data set may include information describing one or more respective color components for at least one or more pixels of the video frame. A data set may be specific to a subset of all pixels in a video frame, although certain embodiments are not limited in this regard. Alternatively or in addition, a data set may be specific to a particular dimension of a color space. By way of illustration and not limitation, color information in a data set may describe for some or all pixels of a video frame only pixel color components which are associated with a particular dimension of a color space. As used herein, "field" refers to a set of all color components for a pixel frame which are associated with a particular dimension of a color space—e.g. where a video frame may be comprised of a red field, a green field and a blue field.

Based on such received video data 205, parallelization layer 210 may determine one or more data sets which are each to be variously distributed across multiple data paths. Determining a data set may include parallelization layer 210 converting data from describing a video frame or portion thereof (e.g. a pixel, color component, field and/or the like) in terms of one color space to describing it in terms of some other color space. By way of illustration and not limitation, video data 205 may include values to identify a pixel color as a location in a first color space, such as a Red-Green-Blue (RGB) color space. Determining a data set may include parallelization layer 210 converting such values to instead identify a corresponding location in a second color space, such as a YUV color space.

Additionally or alternatively, determining a data set may include parallelization layer 210 allocating various data for different respective processing—e.g. based upon whether (or not) such data is associated with a particular dimension of a color space. By way of illustration and not limitation, parallelization layer 210 may identify that video frame information included in video data 205—or generated based on a color space conversion of video data 205—is specific to a particular dimension of a color space. Based on such a determination, parallelization layer 210 may determine whether or how such video frame information is to be further processed by other logic of functional stack 200.

For example, parallelization layer 210 may include or otherwise have access to multiple channels (not shown) to provide a determined data set to encode layer 220. Parallelization layer 210 may distribute a data set across such multiple channels—e.g. where different portions of the data set are sent to different ones of the multiple channels based on the portions being variously associated with different respective dimensions of a color space.

Figure 3:
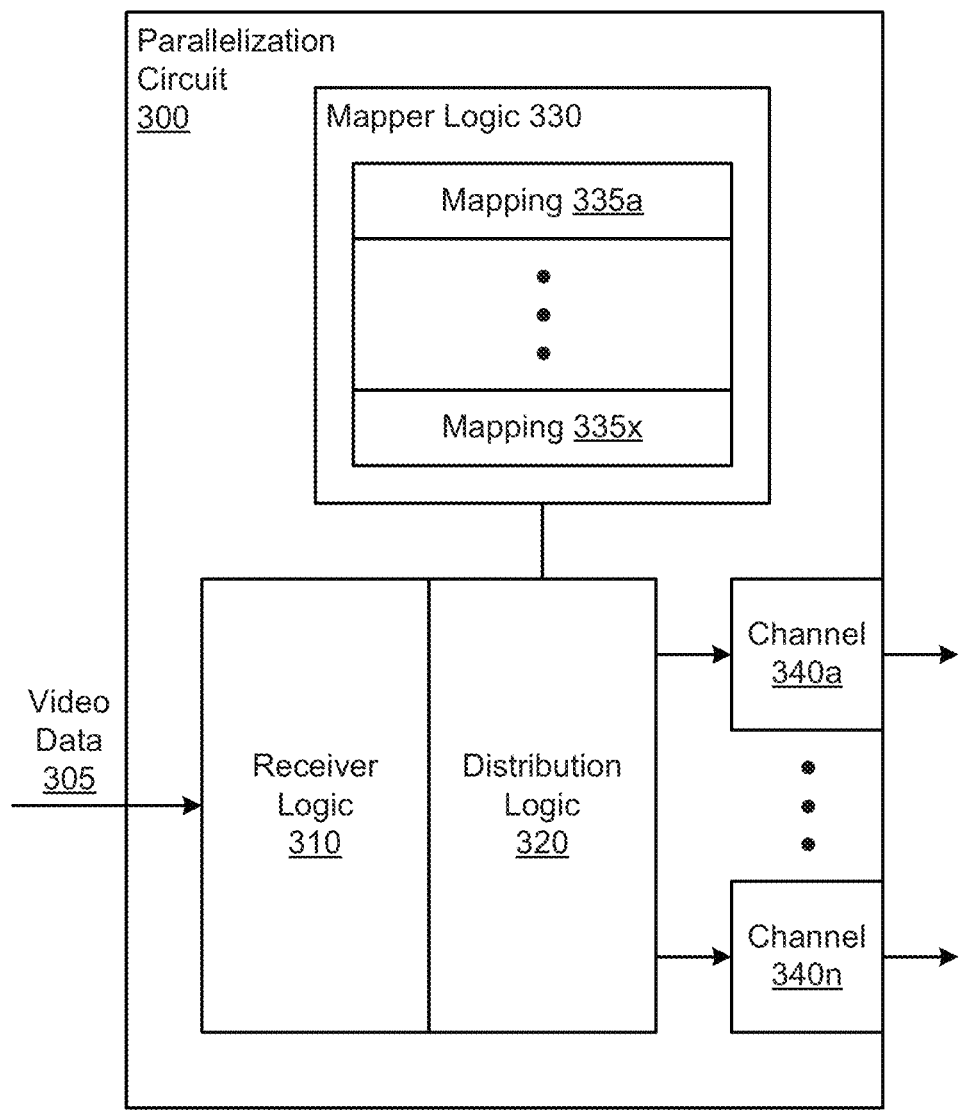
FIG. 3 is a block diagram illustrating elements of a parallelization circuit for distributing video data according to an embodiment.

FIG. 3 illustrates elements of parallelization circuit 300 for providing video data according to an embodiment. Parallelization circuit 300 may include logic to implement some or all of the functionality of parallelization layer 210, for example. In an embodiment, parallelization circuit 300 includes some or all features of video exchange logic 120.

Parallelization circuit 300 may include receiver logic 310 to receive video data 305 which, for example, describes one or more frames of video data. Video data 305 may be provided to parallelization circuit 300 via a stream of data sent over a network and/or via non-volatile storage of a computer platform, although certain embodiments are not limited in this regard.

Receiver logic 310 may determine one or more sets of data based on the receiving of video data 305. Determining one or more such data sets may include receiver logic 310 changing an order, grouping, format and/or other characteristic of one or more portions of video data 305. For example, receiver logic 310 may change an order of some or all of video data 305 so that data portions which are each specific to a particular dimension of a color space are contiguous, or otherwise associated, with each other. Alternatively or in addition, determining one or more such data sets may include receiver logic 310 converting some or all of video data 305 from describing a video frame or portion thereof (e.g. a pixel, component, field and/or the like) in terms of one color space to describing that video frame (or portion thereof) in terms of some other color space. By way of illustration and not limitation, receiver logic 310 may convert RGB values of video data 305 into corresponding YUV values. Receiver logic 310 may also change an ordering, grouping or other associating of portions of such converted data—e.g. as discussed above.

Additionally or alternatively, determining a data set based on video data 305 may include receiver logic 310 identifying that data is to be processed together and/or similarly as a data set—e.g. based upon whether (or not) such data is associated with a particular dimension of a color space. By way of illustration and not limitation, parallelization layer 310 may identify that video frame information included in video data 305 (or generated based on video data 305) is specific to a particular video frame—e.g. specific to a particular portion thereof. Based on such a determination, receiver logic 310 may signal that such video frame information is to be processed together as a data set by other logic of functional stack 200.

In an embodiment, parallelization circuit 300 may include or otherwise have access to multiple channels 340a, . . . , 340n—e.g. for parallel communication of information to other video exchange logic. For example, parallelization circuit 300 may include distribution logic 320 to receive one or more data sets determined by receiver logic 310—e.g. where the distribution logic 320 is to variously distribute such one or more data sets each across channels 340a, . . . , 340n. In an embodiment, distribution of a given data set may include distribution logic 320 sending to each of channels 340a, . . . , 340n a different respective portion of that data set. By way of illustration and not limitation, distribution logic 320 may include logic to detect that a first portion of a data set corresponds to a first dimension of a color space, that a second portion of the data set corresponds to a second dimension of the color space, etc. Based on such detecting, distribution logic 320 may determine for each of the first portion, second portion, etc. a respective one of multiple channels 340a, . . . , 340n to receive that portion.

In an embodiment, distribution of such portions of a data set across channels 340a, . . . , 340n may be according to a mapping of channels 340a, . . . , 340n each to a different respective one of multiple data types which, in turn, each correspond to a respective dimension of a color space. For brevity, the term "channel-dimension mapping" is used herein to refer to a mapping of some multiple channels each a different respective one of multiple data types which each correspond to a respective dimension of a color space. By way of illustration and not limitation, a first channel-dimension mapping may map each of channels 340a, . . . , 340n to a different respective one of a luma (Y) dimension data type, a first chrominance dimension (U) data type and a second chrominance dimension (V) data type for identifying colors in a YUV color space. Additionally or alternatively, a second channel-dimension mapping may, as compared to the first mapping, differently map each of channels 340a, . . . , 340n to a different respective one of such dimension data types for identifying colors in the YUV color space.

Parallelization circuit 300 may include, or otherwise have access to, mapper logic 330 to control how distribution logic 320 is to variously distribute among channels 340a, . . . , 340n one or more data sets determined by receiver logic 310. Mapper logic 330 may selectively implement at different times various channel-dimension mappings, represented functionally by mappings $335a, \ldots, 335x$. In an embodiment, implementing a particular one of mappings $335a, \ldots, 335x$ may include mapper logic 330 storing or otherwise accessing a table or other data repository storing explicit mapping information which defines a particular correspondence of channels $340a, \ldots, 340n$ each to a respective color space dimension. Alternatively or in addition, implementing a particular one of mappings $335a, \ldots, 335x$ may include implicit mapping with a state machine or other such circuitry of mapper logic 330—e.g. including programmable logic such as a field-programmable gate array (FPGA)—which sends one or more control signals to distribution logic 320. In response to such control signals, one or more configurations of distribution logic 320 may be changed to direct various types of data to different ones of channels $340a, \ldots, 340n$.

Figure 4:
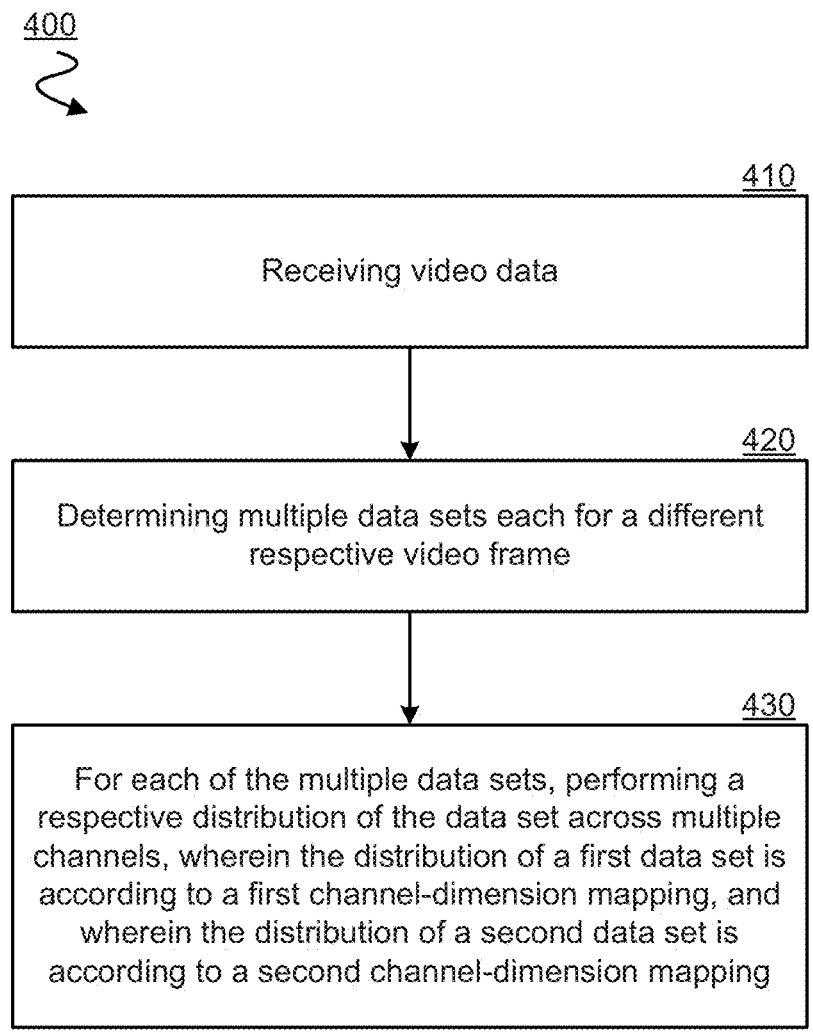
FIG. 4 is a flow diagram illustrating elements of a method for exchanging video data according to an embodiment.

FIG. 4 illustrates elements of method 400 for providing video data according to an embodiment. In an embodiment, method 400 is performed to exchange video communications in a system having some or all of the features of computer system 100. For example, method 400 may be performed by a circuit including some or all of the features of parallelization circuit 300.

Method 400 may include, at 410, receiving video data which describes one or more video frames. Such video data may be received at parallelization logic—e.g. where the data is provided via a network data streaming and/or non-volatile storage of a host computer platform. Based on the received video data, method 400 may, at 420, determine multiple data sets—e.g. including a first data set and a second data set. In an embodiment, determining such multiple data sets includes performing some or all of those operations on video data performed by receiver logic 310.

In an embodiment, multiple data sets determined at 420 may each be for a different respective video frame. For example, a given data set may include data describing, for each of one or more pixels of a corresponding video frame, one or more values each for a respective component which contributes to a color for that pixel. Accordingly, such a data set may include different types of data each to identify component values for different respective dimensions of a color space. By way of illustration and not limitation, a data set determined at 420 may include first type data identifying one or more luma (Y) dimension values, second type data identifying one or more first chrominance (U) dimension values, and third type data identifying one or more second chrominance (V) dimension of a YUV color space. In an embodiment, a data set is specific to a particular dimension of a color space—e.g. where the data set describes some or all of only one field of a video frame. Alternatively or in addition, a data set may be specific to a subset of all pixels in a video frame.

For each of the multiple data sets determined at 420, method 400 may, at 430, perform a respective distribution of the data set across multiple channels. For example, the distribution of the first data set may be according to a first channel-dimension mapping—e.g. a first mapping of the multiple channels each to a different respective one of multiple data types. Each such data type may, in an embodiment, correspond to a different respective dimension of a color space, as discussed above. In an embodiment, the distribution of the second data set is according to a second channel-dimension mapping—different from the first channel-dimension mapping—of the multiple channels each to a different respective one of the multiple data types.

In an embodiment, the multiple channels each couple to, or otherwise correspond to, a different respective one (e.g. only one) of multiple encoders. In such an embodiment, distribution of a first data set may include sending a first portion of the first data set to a first encoder via a first channel and a second portion of the first data set to a second encoder via a second channel—e.g. where the first portion is for one or more values for a first dimension of a color space and the second portion includes one or more values specific to a second dimension of that color space.

The distributions performed at 430 may, in an embodiment, be performed according to a sequence of mappings including the first mapping and the second mapping. For example, mapper logic 330 or other such logic may include a state machine or other such circuitry, for example, to sequentially transition distribution logic—e.g. distribution logic 320—through various distribution configurations. In an embodiment, each such configuration may be for the distribution logic to implement a respective mapping—e.g. a respective one of mappings $335a, \ldots, 335x$. In an embodiment, method 400 performs successive data set distributions which are each according to a respective next successive mapping in a sequence of mappings.

Figure 5:
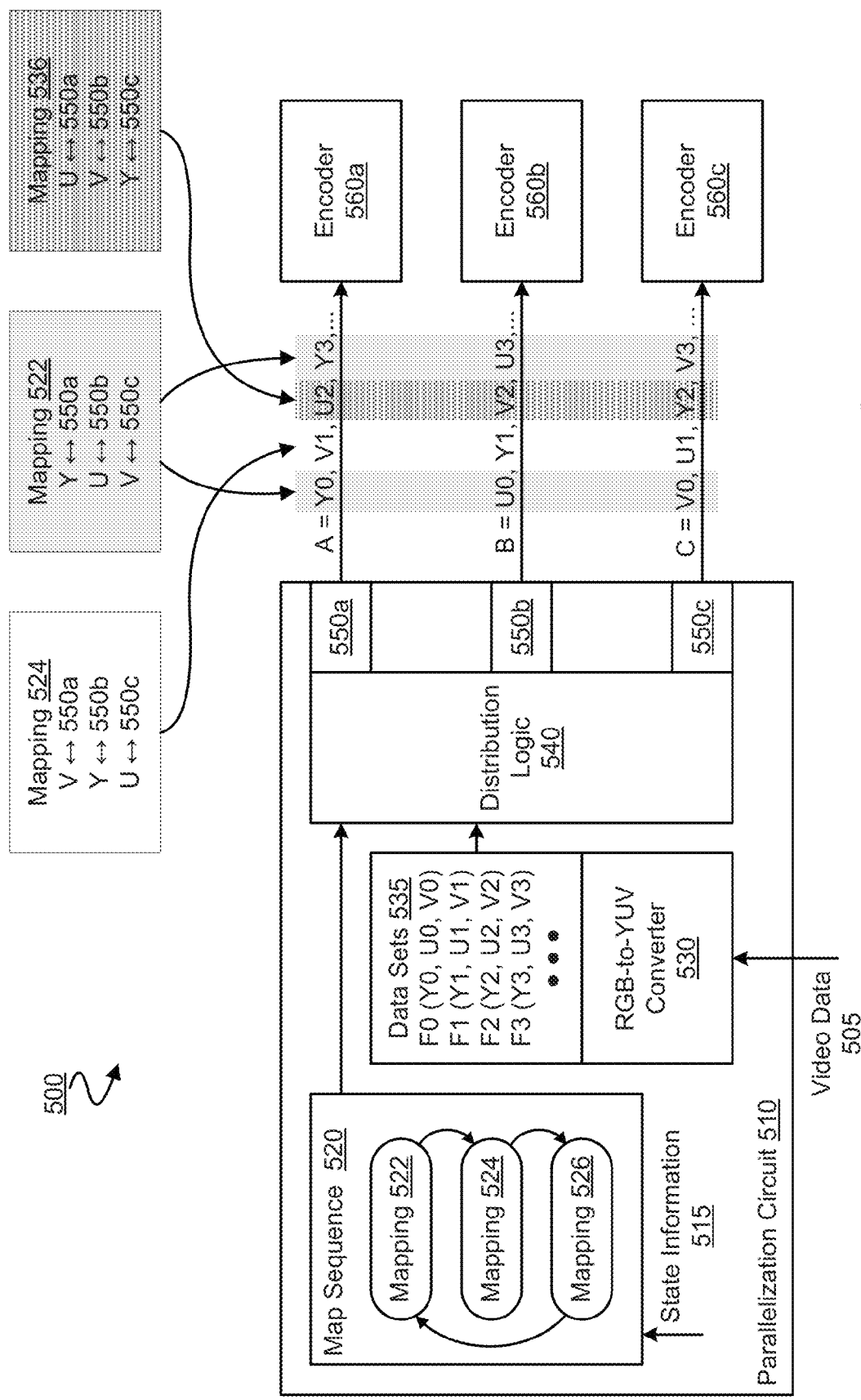
FIG. 5 is a block diagram illustrating elements of video data exchange logic according to an embodiment.

FIG. 5 illustrates elements of video exchange logic 500 for providing video data according to an embodiment. Video exchange logic 500 may operate in a system having some or all of the features of computer system 100. For example, video exchange logic 500 may include some or all of the features of video exchange logic 120.

In an embodiment, video exchange logic 500 includes parallelization circuit 510 to receive video data 505 describing video frames—e.g. describing frames of a video sequence. Parallelization circuit 510 may include some or all of the functionality of parallelization circuit 300, although certain embodiments are not limited in this regard. Functionality of parallelization circuit 510 to receive and operate on video data 505 may provide some or all of the features discussed herein with respect to method 400, for example.

Parallelization circuit 510 may include logic to determine, based on video data 505, data sets 535 for multiple video frames—e.g. including illustrative sets F0, F1, F2, F3. Data sets 535 may each include, for each of multiple dimensions of a color space, respective data of a corresponding data type. For example, each of data sets 535 may include one or more of respective Y-type data, U-type data and V-type data, each data type corresponding to a respective one of Y, U and V dimensions of a color space. In an illustrative embodiment, data set F0 includes portions Y0, U0, V0 for Y dimension information, U dimension information and V dimension information, respectively. Similarly, data set F1 may include portions Y1, U1, V1, data set F2 may include portions Y2, U2, V2 and/or data set F3 may include portions Y3, U3, V3. Data sets 535 may identify video frame color information in terms any of a variety of additional or alternative color space dimensions, according to different embodiments.

The determining of data sets 535 may include parallelization circuit 510 converting one or more values in video data 505 from identifying a location in a first color space to identifying a corresponding location in a second color space. By way of illustration and not limitation, parallelization circuit 510 may include RGB-to-YUV converter 530 to translate RGB values for representing a given pixel color into corresponding YUV values for representing that pixel color. Such conversion may be according to any of a variety of known RGB-to-YUV conversion techniques known in the art, for example. In an alternate embodiment, video data 505 itself identifies pixel colors in terms of YUV values.

Parallelization circuit 510 may include or otherwise have access to multiple channels—e.g. channels 550a, 550b, 550c—across which data sets 535 may be variously distributed. By way of illustration and not limitation, parallelization circuit 510 may include distribution logic 540 coupled to channels 550*a*, 550*b*, 550*c*, where distribution logic 540 may be variously configured at different times to implement different channel-dimension mappings—e.g. different ones of mappings 552, 524, 526. Such configuration of distribution logic 540 may, for example, be according to a map sequence 520 including mappings 522, 524, 526.

In an embodiment, map sequence 520 may be initialized or otherwise synchronized for coordination with one or more other video data processing and/or communication operations. By way of illustration and not limitation, some initial or otherwise current mapping of map sequence 520 may be selected—e.g. by logic such as mapper logic 300—for implementation by distribution logic 540, the selecting based on state information 515 provided at parallelization circuit 510. State information 515 may indicate, for example, a predetermined point of synchronization with some other processing of a particular field, row, column, block, pixel, data type and/or other element associated with a video frame. Such other processing may occur, or be expected to occur, in parallelization circuit 510, in some other hardware of video exchange logic 500, in some display control or conditioning logic which may couple to video exchange logic 500, and/or the like. Based on state information 515, a mapping may be selected to facilitate video data being exchanged in coordination with such other processing.

Distribution logic 540 may perform a first distribution of data set F0 according to some channel-dimension mapping. For example, the first distribution may be according to mapping 522, which maps a Y-dimension data type to channel 550*a*, a U-dimension data type to channel 550*b*, and a V-dimension data type to channel 550*c*. Mapping a particular data type to a particular channel may, for example, include an explicit mapping—e.g. where stored mapping information associates the data type with an encoder coupled or otherwise corresponding to the particular channel. Based on mapping 522, distributing data set F0 may include sending portions Y0, U0, V0 to channels 550*a*, 550*b*, 550*c*, respectively. After distribution of data set F0, distribution logic 540 may be configured to implement a next mapping in map sequence 520—e.g. mapping 524, which maps the V-dimension data type to channel 550*a*, the Y-dimension data type to channel 550*b*, and the U-dimension data type to channel 550*c*. Distribution logic 540 may thereafter perform a distribution of data set F1 according to mapping 524—e.g. including sending portions Y1, U1, V1 to channels 550*b*, 550*c*, 550*a*, respectively.

After distribution of data set F1, distribution logic 540 may be configured to implement a next mapping in map sequence 520—e.g. mapping 526, which maps the U-dimension data type to channel 550*a*, the V-dimension data type to channel 550*b*, and the Y-dimension data type to channel 550*c*. Distribution logic 540 may thereafter perform a distribution of data set F2 according to mapping 526—e.g. including sending portions Y2, U2, V2 to channels 550*c*, 550*a*, 550*b*, respectively. After distribution of data set F2, distribution logic 540 may be configured to implement a next mapping in map sequence 520. In the illustrative scenario, mapping 522 is the next mapping in map sequence 520 after mapping 526. Accordingly, distribution logic 540 may thereafter perform a distribution of data set F3 according to mapping 522—e.g. including sending portions Y3, U3, V3 to channels 550*a*, 550*b*, 550*c*, respectively.

In an embodiment, video exchange logic 500 includes multiple encoders each coupled to a different respective one of the multiple channels—e.g. where encoders 560*a*, 560*b*, 560*c* are coupled to channels 550*a*, 550*b*, 550*c*, respectively. Encoders 560*a*, 560*b*, 560*c* may implement some or all of the functionality of encode layer 220, for example. By way of illustration and not limitation, encoder 560*a* may be coupled to receive via channel 550*a* input A comprising a sequence of portions [Y0, V1, U2, Y3]. Encoder 560*a* may perform a respective encoding operation on each such portion of input A. For example, each of portions Y0, V1, U2, Y3 may be encoded by a respective frequency domain transform operation such as DCT. Some or all of such transform operations may each implement some data compression, in an embodiment.

Alternatively or in addition, encoder 560*b* may be coupled to receive via channel 550*b* input B comprising a sequence of portions [U0, Y1, V2, U3]. Encoder 560*b* may perform a respective encoding operation on each such portion of input B—e.g. by respective frequency domain transform operations such as DCT. Alternatively or in addition, encoder 560*c* may be coupled to receive via channel 550*c* input C comprising a sequence of portions [V0, U1, Y2, V3]. Encoder 560*c* may perform a respective encoding operation on each such portion of input C—e.g. by respective frequency domain transform operations such as DCT.

One advantage provided by various embodiments is that distributing different data set portions via different channels—e.g. on a per-color-space-dimension basis—allows increased throughput, where encoding of multiple color dimensions for some or all of a video frame is performed faster, as compared to performing such encoding with only a single encoder. Another advantage provided by certain embodiments is that implementing multiple different channel-dimension mappings allows for computational load sharing across multiple encoders on a per-color-dimension basis.

For example, luminance (e.g. Y dimension) information for a given pixel, block, frame, etc. tends to be less tolerant of compression, as compared to chrominance (e.g. U dimension or V dimension) information for that same pixel, block, frame, etc. Typically, while stronger compression is allowed for chrominance information, a higher sensitivity of the human eye to luminance characteristics limits the ability to similarly compress Y dimension information, for example. As a result, there may be different computational loads associated with encoding and/or decoding of a data type corresponding to one color dimension of a color space, as compared to encoding and/or decoding of another data type corresponding to a different color dimension of that color space. Implementing different channel-dimension mappings—e.g. including cycling through a sequence of such mappings—allows different encoders operating in parallel to have improved synchronization with one another. For example, video data processing by such encoders may remain synchronized to within a few clock cycles of one another merely by virtue of the encoders each cycling through different respective data types on a per-color-dimension basis for processing each successive data set.

Figure 6:
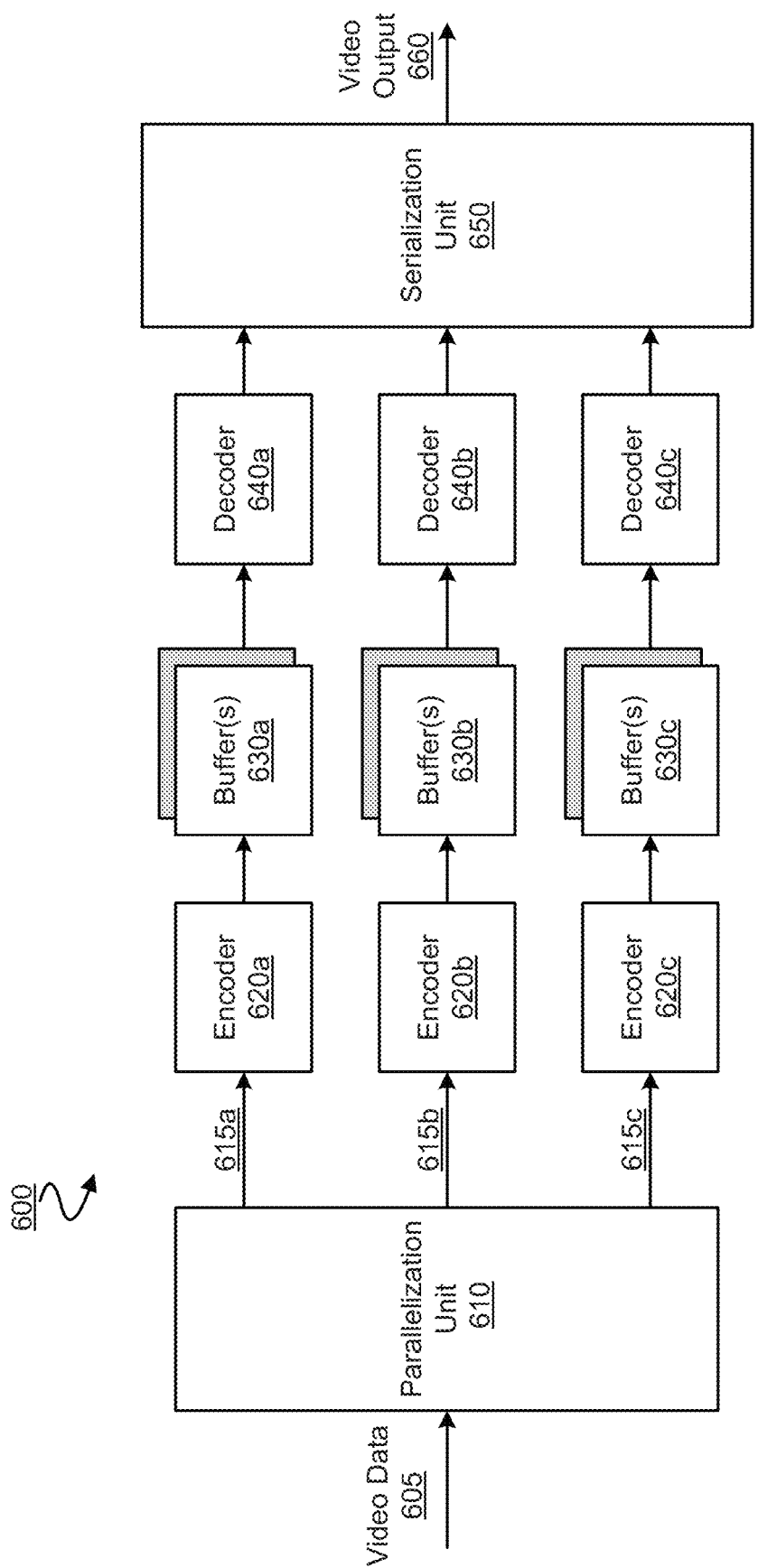
FIG. 6 is a block diagram illustrating elements of a system for exchanging video data according to an embodiment.

FIG. 6 illustrates elements of video exchange logic 600 for providing video data according to an embodiment. Video exchange logic 600 may operate in a system having some or all of the features of computer system 100. For example, video exchange logic 600 may include some or all of the features of video exchange logic 120.

Video exchange logic 600 may include parallelization unit 610 to receive video data 605 and to determine one or more data sets based on video data 605. In an embodiment, parallelization unit 610 implements some of all of the functionality of parallelization layer 210—e.g. where parallelization unit 610 includes some or all of the features of parallelization circuit 300. For each of multiple data sets determined based on video data 605, parallelization unit 610 may perform a distribution of the data set across multiple channels—e.g. including some or all of channels 615, 615b, 615c. The multiple data set distributions may, for example, include both a first distribution of a first data set according to a first channel-dimension mapping and a second distribution of a second data set according to a second channel-dimension mapping.

Video exchange logic 600 may further include encoders 620a, 620b, 620c to receive, via channels 615a, 615b, 615c respectively, different distributed portions of the first data set and different distributed portions of the second data set. Encoders 620a, 620b, 620c may provide some or all of the functionality of encode layer 220, for example. In an embodiment, encoders 620a, 620b, 620c perform, for each received portion of the first data set or second data set, a respective encoding operation such as a frequency domain transform.

Video exchange logic 600 may further include one or more buffers each to receive encoded data set information from a respective one of encoders 620a, 620b, 620c. By way of illustration and not limitation, video exchange logic 600 may include one or more buffers 630a coupled to receive encoded output from encoder 620a, one or more buffers 630b coupled to receive encoded output from encoder 620b and one or more buffers 630c coupled to receive encoded output from encoder 620c. Buffers 630a, 630b, 630c may implement some or all of the functionality of buffer layer 220.

One or more buffers 630a may, for example, include two physical buffers (or alternatively, two logical buffers) arranged in a ping-pong configuration for each to receive alternate portions of encoded data from encoder 620a. For example, encoded data for a field of a first video frame may be buffered to one buffer of one or more buffers 630a, where encoded data for a field of a next subsequent video frame may be buffered to the other buffer of one or more buffers 630. Either or both of one or more buffers 630b and one or more buffers 630c may also be configured—e.g. for similar operation with encoders 620b, 620c, respectively.

Video exchange logic 600 may further include one or more decoders each to variously receive encoded data set information which is debuffered from buffers 630a, 630b, 630c. By way of illustration and not limitation, video exchange logic 600 may include decoder 640a to receive an encoded portion of a data set which has been debuffered from one or more buffers 630a, decoder 640b to receive an encoded portion of that same data set which has been debuffered from one or more buffers 630b, and decoder 640c to receive an encoded portion of that same data set which has been debuffered from one or more buffers 630c. Decoders 640a, 640b, 640c may each perform respective decode operations on the received encoded portions. Such decoding may, for example, include decoders 640a, 640b, 640c performing respective inverse frequency domain transform operations, each to decode/decompress a respective portion of the same data set.

In an embodiment, the decoded data set portions may then be provided in parallel to one another to a serialization unit 650 or other such hardware of video exchange logic 600—e.g. where serialization unit 650 demultiplexes or otherwise serializes such decoded data to generate video output 660. Such output video 660 may then be provided to display conditioning logic (not shown) to facilitate a displaying of a video frame based on output video 660.

Techniques and architectures for exchanging video data are described herein. In the above description, for purposes of explanation, numerous specific details are set forth in order to provide a thorough understanding of certain embodiments. It will be apparent, however, to one skilled in the art that certain embodiments may be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:
   receiving video data;
   determining, based on the received video data, multiple data sets each for a different respective video frame, the multiple data sets including a first data set and a second data set; and
   for each of the multiple data sets, performing with a parallelization circuit a respective distribution of the data set across multiple channels, wherein the distribution of the first data set during a first time period is according to a first mapping of the multiple channels each to a different respective one and only one of multiple data types, wherein the multiple data types each correspond to a different respective one of multiple dimensions of a first color space, wherein the distribution of the second data set during a second time period after the first time period is according to a second mapping of the multiple channels each to a different respective one and only one of the multiple data types, wherein the multiple dimensions of the first color space include a luma dimension, a first chroma dimension and a second chroma dimension, or the multiple dimensions of the first color space include a red dimension, a green dimension and a blue dimension, wherein a total number of the multiple channels is equal to a total number of the multiple dimensions of the first color space, and
   wherein the second mapping is different from the first mapping, wherein, for each of the multiple channels, the data type allocated to that channel according to the first mapping is different than the data type allocated to that channel according to the second mapping.

2. The method of claim 1, wherein each of the multiple channels is coupled to exchange a respective portion of the video data from the parallelization logic to a different respective encoder of multiple encoders.

3. The method of claim 2, further comprising:
   at each of the multiple encoders:
      receiving a respective portion of the first data set; and
      performing a respective frequency domain compression operation on the respective portion of the first data set.

4. The method of claim 1, wherein the received video data includes first video data, and wherein determining the multiple sets of data includes converting the first video data from identifying a location in a second color space to identifying a location in the first color space.

5. The method of claim 1, wherein the first data set includes data for all pixels in a first video frame.

6. The method of claim 1, wherein the respective distributions of the multiple data sets are performed according to a sequence of mappings including the first mapping and the second mapping.

7. The method of claim 6, further comprising:
   receiving synchronization information indicating a state of data communication or data processing associated with the video data; and
   based on the synchronization information, identifying an initial mapping of the sequence of mappings for the performing the respective distributions of the multiple data sets.

8. An apparatus comprising:
   a parallelization circuit including:
      first logic to receive video data and to determine, based on the received video data, multiple data sets each for a different respective video frame, the multiple data sets including a first data set and a second data set;
      distribution logic coupled to the first logic; and
      mapping logic coupled to the distribution logic and to selectively configure the distribution logic to perform, for each of the multiple data sets, a respective distribution of the data set across multiple channels, wherein the distribution of the first data set during a first time period is according to a first mapping of the multiple channels each to a different respective one and only one of multiple data types, wherein the multiple data types each correspond to a different respective one of multiple dimensions of a first color space, wherein the distribution of the second data set during a second time period after the first time period is according to a second mapping of the multiple channels each to a different respective one and only one of the multiple data types,
   wherein the multiple dimensions of the first color space include a luma dimension, a first chroma dimension and a second chroma dimension, or the multiple dimensions of the first color space include a red dimension, a green dimension and a blue dimension,
   wherein a total number of the multiple channels is equal to a total number of the multiple dimensions of the first color space, and
   wherein the second mapping is different from the first mapping, wherein, for each of the multiple channels, the data type allocated to that channel according to the first mapping is different than the data type allocated to that channel according to the second mapping.

9. The apparatus of claim 8, wherein the received video data includes first video data, and wherein the first logic to determine the multiple sets of data includes the first logic to convert the first video data from identifying a location in a second color space to identifying a location in the first color space.

10. The apparatus of claim 8, wherein the first data set includes data for all pixels in a first video frame.

11. The apparatus of claim 8, wherein the distribution logic to perform the respective distributions of the multiple data sets according to a sequence of mappings including the first mapping and the second mapping.

12. The apparatus of claim 11, wherein:
    the mapping logic further to receive synchronization information indicating a state of data communication or data processing associated with the video data; and
    based on the synchronization information, the mapping logic further to identify an initial mapping of the sequence of mappings for the distribution logic to perform the respective distributions of the multiple data sets.

13. A system comprising:
    a parallelization circuit including:
       first logic to receive video data and to determine, based on the received video data, multiple data sets each for a different respective video frame, the multiple data sets including a first data set and a second data set;
       distribution logic coupled to the first logic; and
       mapping logic coupled to the distribution logic and to selectively configure the distribution logic to perform, for each of the multiple data sets, a respective distribution of the data set across multiple channels, wherein the distribution of the first data set during a first time period is according to a first mapping of the multiple channels each to a different respective one and only one of multiple data types, wherein the multiple data types each correspond to a different respective one of multiple dimensions of a first color space, wherein the distribution of the second data set during a second time period after the first time period is according to a second mapping of the multiple channels each to a different respective one and only one of the multiple data types, wherein the multiple dimensions of the first color space include a luma dimension, a first chroma dimension and a second chroma dimension, or the multiple dimensions of the first color space include a red dimension, a green dimension and a blue dimension, wherein a total number of the multiple channels is equal to a total number of the multiple dimensions of the first color space, and wherein the second mapping is different from the first mapping, wherein, for each of the multiple channels, the data type allocated to that channel according to the first mapping is different than the data type allocated to that channel according to the second mapping; and a first encoder, a second encoder and a third encoder each coupled to the parallelization circuit via a different respective one of the multiple channels.

14. The system of claim 13, wherein each of the first encoder, the second encoder and the third encoder is to receive a respective portion of the first data set and to perform a respective frequency domain compression operation on the respective portion of the first data set.

15. The system of claim 13, wherein the received video data includes first video data, and wherein the first logic to determine the multiple sets of data includes the first logic to convert the first video data from identifying a location in a second color space to identifying a location in the first color space.

16. The system of claim 13, wherein the distribution logic to perform the respective distributions of the multiple data sets according to a sequence of mappings including the first mapping and the second mapping.

17. The system of claim 16, wherein:

the mapping logic further to receive synchronization information indicating a state of data communication or data processing associated with the video data; and based on the synchronization information, the mapping logic further to identify an initial mapping of the sequence of mappings for the distribution logic to perform the respective distributions of the multiple data sets.

* * * * *